US008396283B2

(12) United States Patent
Iihoshi et al.

(10) Patent No.: US 8,396,283 B2
(45) Date of Patent: Mar. 12, 2013

(54) THREE-DIMENSIONAL OBJECT DETECTING DEVICE

(75) Inventors: Akira Iihoshi, Saitama (JP); Yasushi Ueda, Saitama (JP); Satoko Furuki, Saitama (JP); Zhencheng Hu, Kumamoto (JP); Keiichi Uchimura, Kumamoto (JP); Naoki Kourogi, Ibaraki (JP)

(73) Assignees: Honda Motor Co., Ltd., Tokyo (JP); Kumamoto University, Kumamoto (JP)

( * ) Notice: Subject to any disclaimer, the term of this patent is extended or adjusted under 35 U.S.C. 154(b) by 1148 days.

(21) Appl. No.: 12/223,638

(22) PCT Filed: Feb. 7, 2007

(86) PCT No.: PCT/JP2007/052138

§ 371 (c)(1),
(2), (4) Date: Nov. 19, 2008

(87) PCT Pub. No.: WO2007/091604

PCT Pub. Date: Aug. 16, 2007

(65) Prior Publication Data

US 2009/0226035 A1 Sep. 10, 2009

(30) Foreign Application Priority Data

Feb. 9, 2006 (JP) ................................ 2006-033111

(51) Int. Cl.
*G06K 9/00* (2006.01)
*G06K 9/32* (2006.01)

(52) U.S. Cl. ......................... 382/154; 382/106; 382/286

(58) Field of Classification Search .................. 382/103, 382/106, 154, 294; 345/419–427; 356/12
See application file for complete search history.

(56) References Cited

U.S. PATENT DOCUMENTS 6,493,620 B2 * 12/2002 Zhang ............................ 701/45
6,757,009 B1 * 6/2004 Simon et al. .................. 348/148

(Continued)

FOREIGN PATENT DOCUMENTS

EP 1 251 465 A2 10/2002
EP 1 482 448 A2 12/2004

(Continued)

OTHER PUBLICATIONS

Trivedi et al, Occupant Posture Analysis With Stereo and Thermal Infrared Video: Algorithms and Experimental Evaluation, IEEE Transactions on Vehicular Technology, vol. 53, No. 6, Nov. 2004.*

(Continued)

*Primary Examiner* — Andrae S Allison
(74) *Attorney, Agent, or Firm* — Carrier Blackman & Associates, P.C.; Joseph P. Carrier; William D. Blackman

(57) ABSTRACT

A three-dimensional-object can be effectively detected. A pair of image capture devices capture a three-dimensional-object and calculate disparity component data of subdivided-image regions, respectively. On a basis of the disparity component data, gray scale values indicative of distances from the image capture device are calculated and a gray scale image in which each region has its corresponding gray scale value is generated. A model of the three-dimensional-object is defined and correlation values is calculated to show the degree of a similarity between the model and the image subdivided regions in the gray scale image. The model is a two-dimensional image with a shaping characteristic when the three-dimensional object is viewed from positions of the image capture devices while each subdivided region of the two-dimensional image has a gray scale value indicative of a distance from the image capture device at a portion corresponding to the three-dimensional object. The correlation values are calculated on a basis of gray scale values of the model and those of the image region in the gray scale image. The model and an image region with the highest correlation value are detected in the gray scale image, so that a three-dimensional image is detected.

18 Claims, 13 Drawing Sheets

1
10 LIGHT SOURCE
11
12 IMAGE CAPTURE DEVICE
13 IMAGE CAPTURE DEVICE
OBJECT (OCCUPANT)
15 PROCESSING DEVICE
21 DISPARITY IMAGE GENERATOR
22 BACKGROUND ELIMINATING UNIT
23 DISPARITY IMAGE VACANT AT SEAT
24 NORMALIZING UNIT
26 CORRELATION UNIT
25 HEAD MODEL
POSITION, SIZE AND ATTITUDE OF OBJECT

U.S. PATENT DOCUMENTS

| | | | | |
|---|---|---|---|---|
| 7,372,996 | B2 * | 5/2008 | Luo et al. | 382/203 |
| 7,386,192 | B2 * | 6/2008 | Oota | 382/300 |
| 7,508,979 | B2 * | 3/2009 | Comaniciu et al. | 382/154 |
| 7,526,120 | B2 * | 4/2009 | Gokturk et al. | 382/154 |
| 7,894,633 | B1 * | 2/2011 | Harman | 382/106 |
| 2002/0169532 | A1 | 11/2002 | Zhang | |
| 2003/0209893 | A1 * | 11/2003 | Breed et al. | 280/735 |
| 2004/0022418 | A1 * | 2/2004 | Oota | 382/106 |
| 2004/0240706 | A1 | 12/2004 | Wallace et al. | |
| 2005/0058337 | A1 | 3/2005 | Fujimura et al. | |
| 2007/0183651 | A1 * | 8/2007 | Comaniciu et al. | 382/154 |

FOREIGN PATENT DOCUMENTS

| | | |
|---|---|---|
| JP | 09-033227 | 2/1997 |
| JP | 2001-091232 | 4/2001 |
| JP | 2001-331790 | 11/2001 |
| JP | 2002-216129 | 8/2002 |
| JP | 2003-040016 | 2/2003 |
| JP | 2004-053324 | 2/2004 |

OTHER PUBLICATIONS

SooYoung Ha, Sang-Ho Ahn, Young-Choon Kim, Mu-Yeon Kim, Soo-Yeon Son, Kuhn-Il Lee. Vehicle Occupant Head Distance Extraction Method using Stereo-Vision. In Proceedings of IPCV'2006. pp. 180-183.*

Krotosky, S.J.; Cheng, S.Y.; Trivedi, M.M.; , "Real-time stereo-based head detection using size, shape and disparity constraints," Intelligent Vehicles Symposium, 2005. Proceedings. IEEE , vol., No., pp. 550-556, Jun. 6-8, 2005.*

Zhencheng Hu; Kawamura, T.; Uchimura, K.; , "Grayscale Correlation based 3D Model Fitting for Occupant Head Detection and Tracking," Intelligent Vehicles Symposium, 2007 IEEE , vol., No., pp. 1252-1257, Jun. 13-15, 2007.*

* cited by examiner

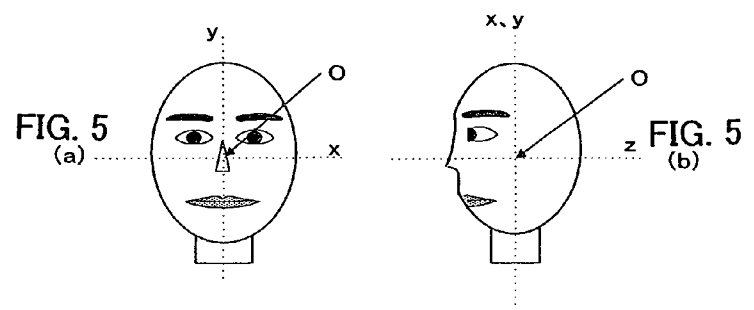
FIG. 5 (a)
FIG. 5 (b)
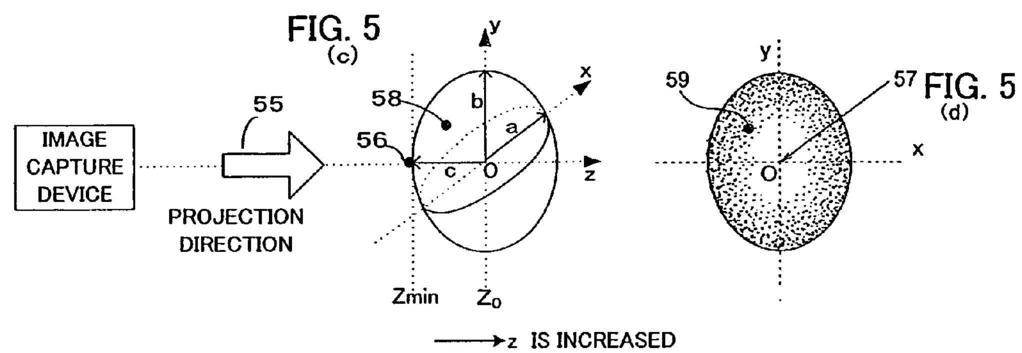
FIG. 5 (c)
FIG. 5 (d)
FIG. 6
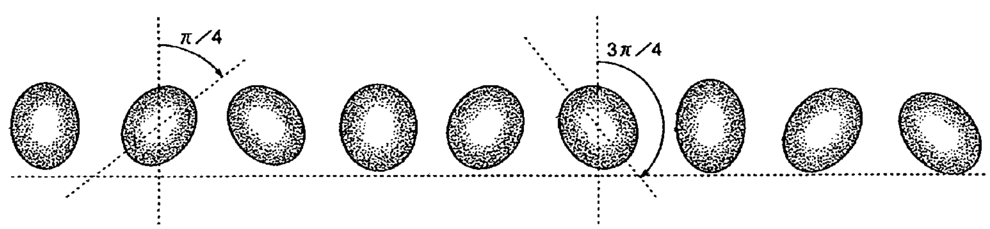

Scene:60127 Frame:10

OBJECT (OCCUPANT)
70
DISTANCE MEASURING DEVICE
15
PROCESSING DEVICE
1
71
DISTANCE IMAGE GENERATOR
72
BACKGROUND ELIMINATING UNIT
73
DISTANCE IMAGE AT VACANT SEAT
74
NORMALIZING UNIT
76
CORRELATION UNIT
75
HEAD MODEL
POSITION, SIZE AND ATTITUDE OF OBJECT

THREE-DIMENSIONAL OBJECT DETECTING DEVICE

TECHNICAL FIELD

The present invention relates to a three-dimensional object detecting device, more specifically to a device which can detect a three-dimensional object by two-dimensional image processing.

BACKGROUND ART

Conventionally, various techniques have been proposed for detecting three-dimensional objects. A fitting technique may be a leading one. In the fitting technique, a position, a size and the like of the object are estimated from three dimensionally-measured coordinates. For example, an elliptic sphere is expressed by equation (1).

[Formula 1]

$$\frac{(x-X_0)^2}{a^2}+\frac{(y-Y_0)^2}{b^2}+\frac{(z-Z_0)^2}{c^2}=1 \quad (1)$$

In the equation, $X_0$, $Y_0$, and $Z_0$ indicate center coordinates of the elliptic sphere, and a, b, and c are parameters determining a size of the elliptic sphere. In order to estimate a position and a size of the elliptic sphere, it is necessary to identify the center coordinates and the other parameters. Furthermore, in the case where the elliptic sphere is rotated, it is necessary to identify nine parameters including a three-dimensional rotation angle. For example, least squares, extended Hough transform, or a Kalmnan filter method is used in the identification.

Various techniques for detecting a human face have also been proposed. For example, a pair of stereographic color images is obtained with a pair of color image capture devices, and a distance image is generated from the pair of stereographic color images. A model expressing an outline of a face is generated from the distance image. On the other hand, a flesh-colored image region and an edge are extracted from one of the pair of stereographic color images. A correlation between the edge and flesh-colored image region and the outline model is correlated to detect a face region (see Patent Document 1).

There is also proposed a technique for detecting an occupant in a vehicle. For example, an ellipse whose shape approximates the occupant head is previously stored as a reference head image. An area-image sensor is provided in the vehicle to obtain an image including the occupant head. Many boundaries are extracted from brightness values of the image, and the outline of the substantially elliptic shape is detected from the boundaries. The occupant is identified by matching between the detected outline of the substantially elliptic shape and the reference head image (see Patent Document 2).

Patent Document 1: Japanese Patent Publication Laid-Open No. 2002-216129

Patent Document 2: Japanese Patent Publication Laid-Open No. 2004-53324

DISCLOSURE OF THE INVENTION

Problem to be Solved by the Invention

A huge amount of computation is required for the above-described three-dimensional identifying process. When an object is detected in real time, a large delay may be generated in object detection using identifying process mentioned above.

Color image capture devices may increase costs. Additionally, human flesh color varies from individual to individual across the word, and therefore an object may be mistakenly detected.

On the other hand, in order to control an airbag, for example, it is desired that a position of the head of an occupant is detected in a vehicle. In the technique disclosed in Patent Document 2, the head is detected by a two-dimensional shape matching, and distance information is not used in the two-dimensional shape matching. Therefore, when a three-dimensional object is detected, accuracy of detection may be lowered from a viewpoint of distance information.

Accordingly, an object of the present invention is to propose a three-dimensional object detecting technique adapted for real-time processing. Another object of the present invention is to propose a technique in which a three-dimensional object can be detected with higher accuracy while the computation load is restrained. Still another object of the present invention is to propose a technique for detecting a position, a size, and an attitude of the three-dimensional object.

Another object of the present invention is to propose a technique by which the human head can be detected in real time. Still another object of the present invention is to propose a technique by which the occupant head in a vehicle can be detected in real time.

Means for Solving the Problem

According to a first aspect of the invention, a three-dimensional object detecting device includes pair of image capture devices which take images of a three-dimensional object. Furthermore, disparity data is computed for each region based on the images obtained by the pair of image capture devices, and each region is obtained by dividing the images. Based on the disparity data computed for each region, a gray-scale value indicating a distance to the image capture device is computed and a gray-scale image having a gray-scale value corresponding to each region is generated. The object detecting device includes a storage device in which a model formed by modeling the three-dimensional object is stored. The object detecting device computes a correlation value indicating a similarity between the model and an image region in the gray-scale image. The model is a two-dimensional image having a geometric feature when the three-dimensional object is viewed from a direction in which the image capture device is located, and each region obtained by dividing the two-dimensional image has a gray-scale value indicating a distance to the image capture device, of a corresponding portion of the three-dimensional object. The correlation value is computed based on a gray-scale value of the model and a gray-scale value of the image region in the gray-scale image. Furthermore, the object detecting device detects the three-dimensional object by detecting an image region having the highest correlation value with the model, in the gray-scale image.

According to the invention, the model is a two-dimensional image, a shape of the two-dimensional image has a geometric feature of the object to be detected, and each region of the two-dimensional image has a gray-scale value indicating the distance to the object. Therefore, a position, a size, and an attitude of the three-dimensional object can be detected by two-dimensional level image processing. Because load of computation can be reduced compared with three-dimensional level image processing, the distance measuring device of the invention is adapted for real-time processing.

In an embodiment of the invention, a distance measuring device is used instead of the image capture devices. The distance measuring device measures a distance from the distance measuring device to each region which is obtained by dividing a predetermined range including the object. A gray-scale value indicating a measured distance to each region is computed, and a gray-scale image having a gray-scale value corresponding to each region is generated.

According to the invention, a position, a size, and an attitude of the three-dimensional object can be detected by the distance measuring device such as that using laser scanning.

According to an embodiment of the invention, plural models are prepared according to a size and an attitude of the object. Correlation values are computed for each of the plurality of models, and a size and an attitude of the object are determined based on the model correlated with an image region having the highest correlation value, in the plurality of models.

According to the invention, various sizes and attitudes of the object can be detected.

According to an embodiment of the invention, the three-dimensional object is a human head, and the model is a two-dimensional image having an elliptic shape.

According to the invention, the human head can be detected by two-dimensional level image processing. Additionally, because gray-scale correlation is used, color image capture devices are not required even if a human is detected.

According to an embodiment of the invention, the detected human head is a head of a human riding on a vehicle. Accordingly, the vehicle can be controlled in various ways according to the detection of the human head.

According to an embodiment of the invention, occupant region is detected, where the occupant exists, in the image obtained by the image capture device, based on the disparity data when the occupant sits on a seat and the disparity data at a vacant seat. A gray-scale image is generated based on the occupant region.

According to the invention, computation efficiency can further be enhanced because a region where the gray-scale image is generated is restricted. For a distance image generated with the distance measuring device, the occupant region can also be detected similarly.

According to an embodiment of the invention, pattern light illuminating means for illuminating the object with pattern light having a predetermined pattern is provided. The disparity data can be computed with higher accuracy using the pattern light.

BRIEF DESCRIPTION OF THE DRAWINGS

FIG. 5 is a view explaining a head model according to an embodiment of the invention.

FIG. 6 is a view showing an example of plural kinds of head models according to an embodiment of the invention.

DESCRIPTION OF REFERENCE NUMERALS

1 object detecting device
23 and 26 memory
11 and 12 image capture device
15 processing device
70 distance measuring device

BEST MODE FOR CARRYING OUT THE INVENTION

Figure 1:
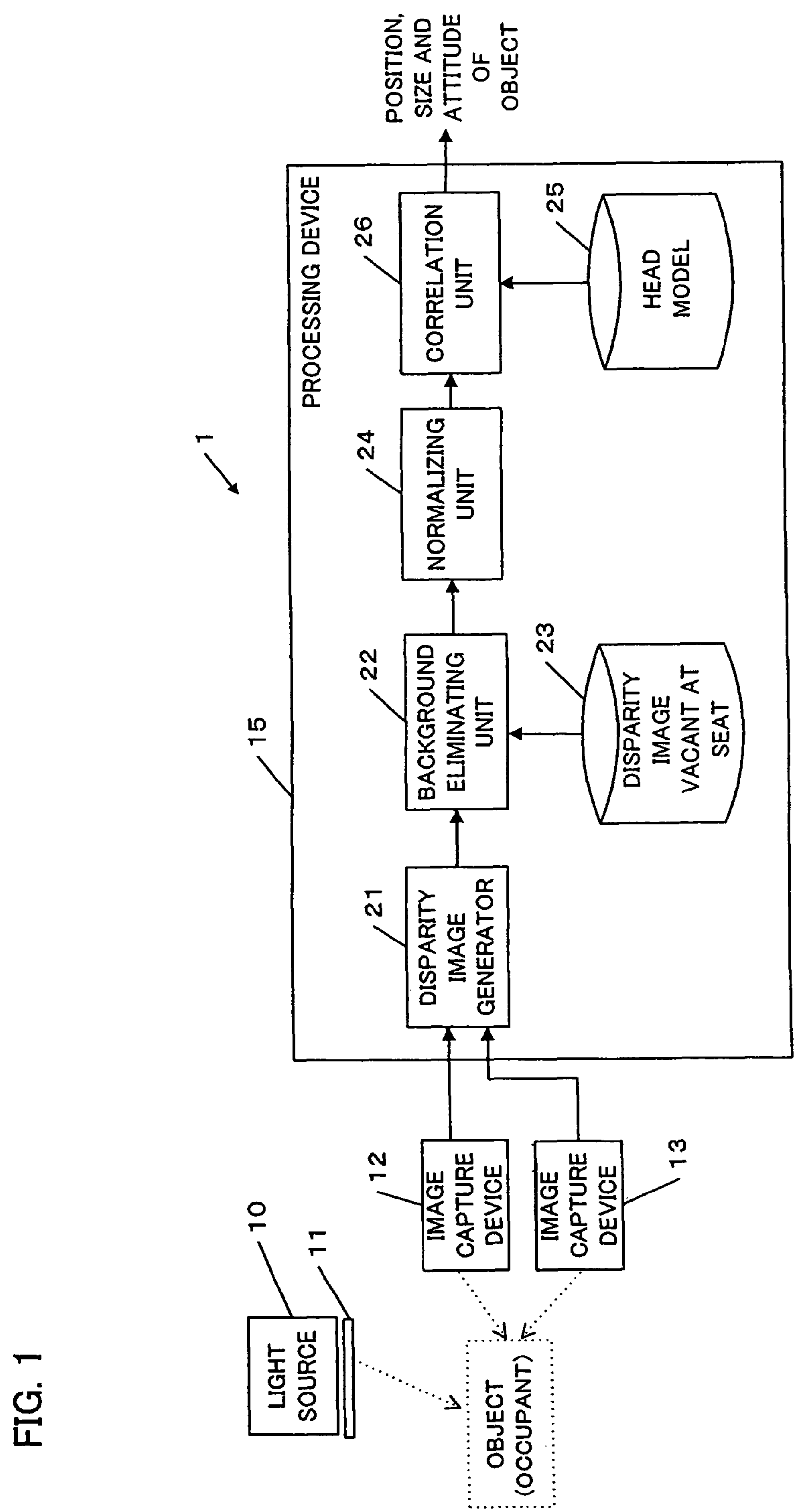
FIG. 1 is a block diagram showing an object detecting device according to an embodiment of the invention.

Exemplary embodiments of the invention will be described below with reference to the accompanying drawings. FIG. 1 shows a configuration of an object detecting device 1 according to an embodiment of the invention.

In the embodiment, the object detecting device 1 is mounted on a vehicle, and a mode in which a head of an occupant is detected is shown below. However, it is to be noted that the object detecting device is not limited to the mode. A detailed description on the point will be given later.

A light source 10 is disposed in the vehicle so as to be able to illuminate the head of the occupant sitting on a seat. For example, the light source 10 is disposed in an upper front portion of the seat.

Preferably a near infrared ray (IR light) is used as the light with which the head of the occupant is illuminated. Usually when an image of the occupant head is taken, brightness depends on an environmental change such as daytime and nighttime. When a face is illuminated with strong visible light from one direction, gradation is generated in the facial surface. Near infrared rays have robustness against fluctuation in illumination and gradation in shade.

In the embodiment, a pattern mask (filter) 11 is provided in front of the light source 10 such that the occupant is illuminated with lattice-shaped pattern light. Disparity can be computed with higher precision by use of the pattern light as described below. A detailed description concerning the point will be given later.

A pair of image capture devices 12 and 13 is disposed near the occupant head so as to take a two-dimensional image including the occupant head. The image capture devices 12 and 13 are disposed so as to be horizontally, vertically or diagonally away from each other by a predetermined distance. The image capture devices 12 and 13 have optical band-pass filter so as to receive near infrared rays alone from the light source 10.

For example, a processing device 15 is realized by a microcomputer which includes a CPU which performs various computations, a memory in which a program and computation results are stored, and an interface which performs data input and output. Considering the above, in FIG. 1 the processing device 15 is represented by functional blocks. Some or all of the functional blocks can be realized by an arbitrary combination of the software, firmware, and hardware. For example, the processing device 15 is realized by an Electronic Control Unit (ECU) mounted on the vehicle. ECU is a computer including a CPU and a memory in which computer programs for realizing various kinds of control of the vehicle and data are stored.

A disparity image generating unit 21 generates a disparity image on the basis of the two images taken by the image capture devices 12 and 13.

Figure 2:
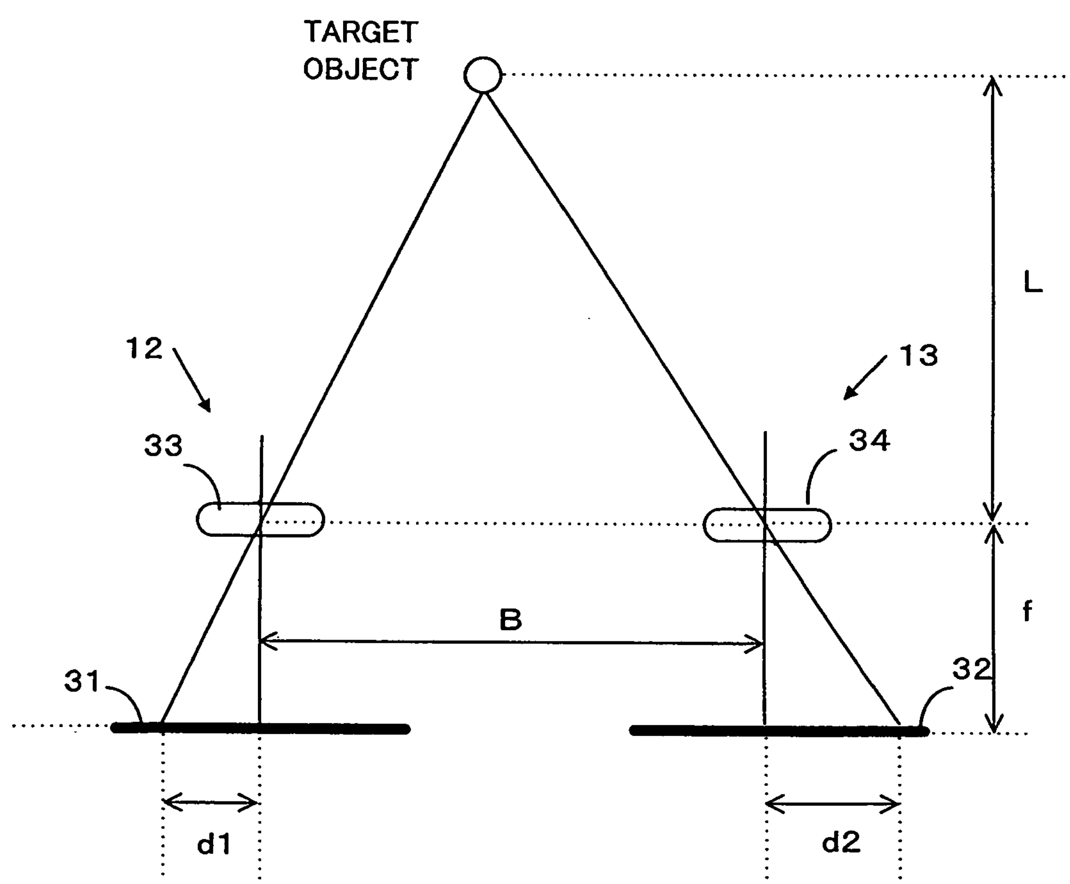
FIG. 2 is a view explaining a disparity computing technique according to an embodiment of the invention.

An example of a technique for computing a disparity will briefly be described with reference to FIG. 2. The image capture devices 12 and 13 include image capture element arrays 31 and 32, which are two-dimensional arrays, and lenses 33 and 34, respectively. For example, the image capture elements are formed by CCD elements or CMOS elements.

A distance (base-line length) between the image capture devices 12 and 13 is indicated by B. The image capture element arrays 31 and 32 are disposed at focal length f of the lenses 33 and 34, respectively. On the image capture element array 31, an image of a target object located at a distance L from the plane on which the lenses 33 and 34 exist is formed at a position shifted by d1 from the optical axis of the lens 33. On the other hand, on the image capture element array 32, the image of the target object is formed at a position shifted by d2 from the optical axis of the lens 34. The distance L is obtained by $L=B\cdot f/d$ according to the principle of triangulation, where d is a disparity, that is, (d1+d2).

In order to obtain the disparity d, a corresponding block on the image capture element array 32, in which an image of a target object portion identical with that of a certain block of the image capture element array 31 is taken, is searched for. An arbitrary size of blocks can be set. For example, one pixel or plural pixels (for example, eight by three pixels) may be set as one block.

According to a certain technique, a corresponding block is searched for by scan with a block of an image obtained by one of the image capture devices 12 and 13 on an image obtained by the other of the image capture devices 12 and 13 (block matching). An absolute value of a difference between a brightness value of a block (for example, an average of brightness values of pixels in the block) and that of the other block, is obtained and the absolute value is defined as a correlation value. The block with which the correlation value shows the minimum is found, and the distance between the two blocks at that time indicates a disparity d. Alternatively, the searching process may be realized by another technique.

Matching between blocks is hardly performed in the case there are blocks in which brightness value is not changed. However, a change in brightness value can be generated in a block by the pattern light, so that the block matching can be realized with higher accuracy.

In the image taken by one of the image capture devices 12 and 13, a disparity value computed for each block is correlated with pixel values included in the block, and the pixel values are defined as a disparity image. The disparity value indicates a distance between the target object taken in the pixels and the image capture devices 12 and 13. As a disparity value increases, a position of the target object is getting closer to the image capture devices 12 and 13.

A background eliminating unit 22 eliminates a background from the disparity image such that an image region (referred to as an occupant region) in which an image of a person is taken is extracted by any appropriate technique. The image region to be processed later is restricted by eliminating the background, and thus computation efficiency can be enhanced.

Figure 3:
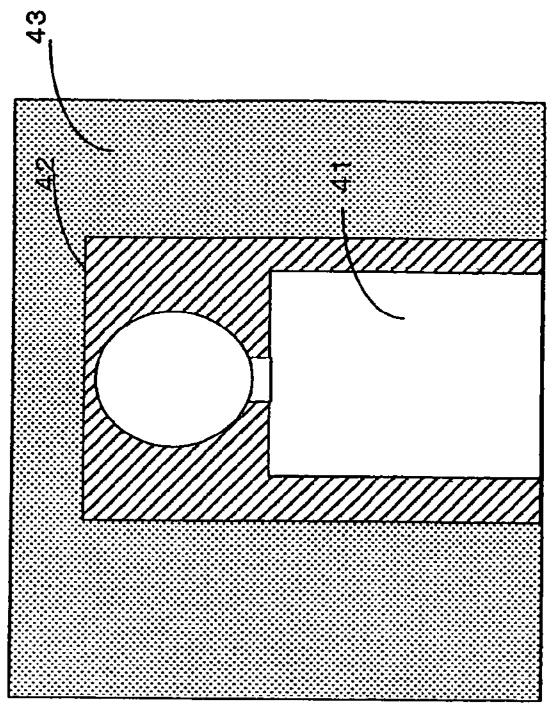
FIG. 3 is a view explaining background elimination according to an embodiment of the invention.
Figure 3:
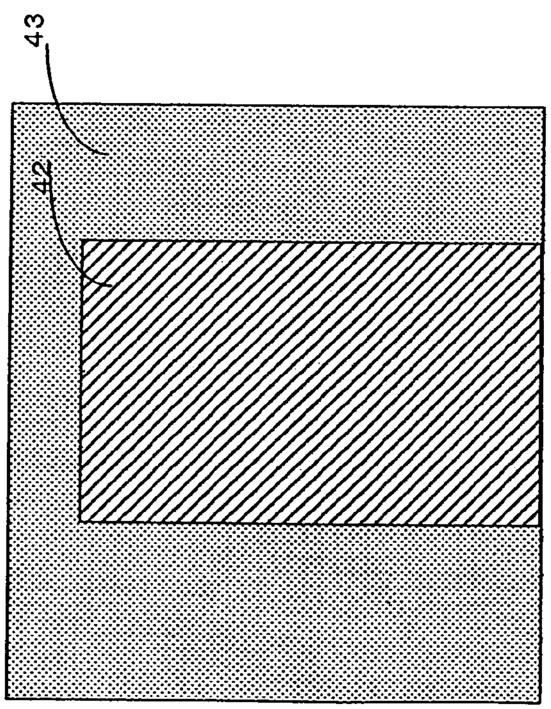
Figure 3:
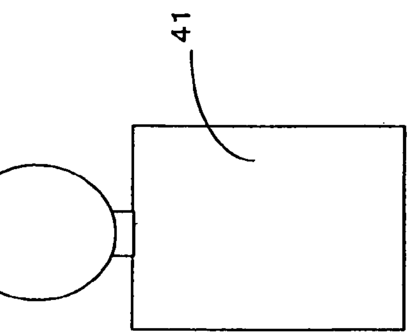

In the embodiment, as shown in a part (a) of FIG. 3, a disparity image generated from an image in which a person does not exist (that is, vacant seat) is previously stored in a memory 23. An image region 42 indicates a seat and an image region 43 indicates the background of the seat. The disparity image at the vacant seat can be generated by in such a way as mentioned above. The disparity image at the vacant seat differs from a disparity image which is generated when an occupant sits on the seat as shown in a part (b) of FIG. 3 in disparity values of an occupant region 41. Accordingly, as shown in a part (c) of FIG. 3, the occupant region 41 can be extracted by extracting pixels having disparity values which differ by an amount not smaller than a predetermined value.

A disparity image at the vacant seat varies depending on a seat position and a seat inclination. Plural disparity images at the vacant seat, prepared according to seat positions and seat inclinations, can be stored in the memory 23. A sensor (not shown) is provided in the vehicle to detect a seat position and a seat inclination. The background eliminating unit 22 reads, from the memory 23, a corresponding disparity image at the vacant seat according to a seat position and a seat inclination detected by the sensor, and the background eliminating unit 22 can read the corresponding disparity image at the vacant seat from the memory 23 and eliminate the background using the corresponding disparity image. Therefore, even if a seat position and/or an inclination is changed, the background eliminating unit 22 can extract the occupant region with higher accuracy.

A normalizing unit 24 performs normalization of the occupant region 41. The normalization allocates a gray-scale value to each pixel of the occupant region according to a distance from the image capture devices 11 and 12. The normalization is performed using equation (2).

[Formula 2]

$$d'(x, y) = (2^N - 1)\frac{d(x, y) - d\min}{d\max - d\min} \tag{2}$$

In the equation, d(x,y) indicates a disparity value at a position x, y of the occupant region, while N is the number of bits of the gray scale. For example, N is 9 and the 512-level gray scale having gray-scale values 0 to 511 is realized. The gray-scale value of 0 indicates black and the gray-scale value of 511 indicates white. d'(x,y) indicates a gray-scale value computed for the position x, y of the occupant region. The maximum disparity value dmax corresponds to the minimum value of distance from the image capture device, and the minimum disparity value dmin corresponds to the maximum value of distance from the image capture device.

As shown by equation (2), in the normalization, the highest gray-scale value (in this case, white) is allocated to the pixel corresponding to the maximum disparity value dmax, and a gray-scale value is gradually decreased as a disparity value d is decreased. In other words, the highest gray-scale value is allocated to the pixel corresponding to the minimum distance value, and a gray-scale value is gradually decreased as a distance to the image capture device is increased. Thus, a gray-scale image of which each pixel has a gray-scale value indicating a distance to the image capture device is generated from the occupant region.

Figure 4:
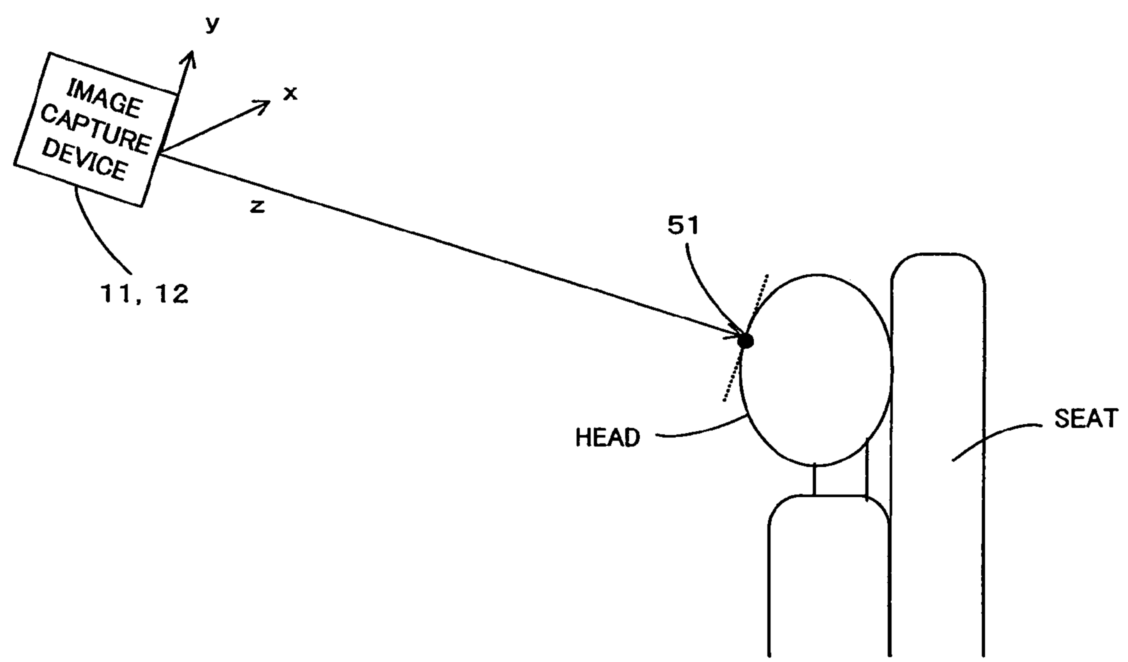
FIG. 4 is a view explaining an example of a maximum disparity value according to an embodiment of the invention.

As shown in FIG. 4, when the occupant sits on the seat without putting a hand in front of the head, the maximum disparity value dmax usually appears on a certain portion of the head of the occupant as shown by reference numeral 51. In the occupant region, the highest gray-scale value is allocated to the pixel corresponding to the portion of the head. Because the head has a shape similar to an elliptic sphere, disparity value d is gradually decreased toward the edge from the portion of the head, thereby gradually decreasing a gray-scale value.

Even if the maximum disparity value appears not on the head but on another portion (for example, the hand or the shoulder), a disparity value of the head is gradually decreased toward the edge from the head portion closest to the image capture device, thereby gradually decreasing a gray-scale value, because the head has an elliptic sphere shape.

Referring to FIG. 1, a head model by which a human head is modeled is stored in a memory 25 (which may be the memory 23). A technique of generating the human head model will be described with reference to FIG. 5. As shown in parts (a) and (b) of FIG. 5, the human head has a feature that the shape of the human head is similar to an elliptic sphere. Accordingly, the human head can be expressed by an elliptic sphere.

The elliptic sphere is formed based on space coordinates in the vehicle. For example, as shown in FIG. 4, the positions of the image capture devices 11 and 12 are set at origins in the space coordinates in the vehicle. Z-axis is extended from an image capture device in a direction perpendicular to the image capture device, and a z-value indicates a distance from the image capture device. X-axis is set in a vehicle width direction and in a direction perpendicular to the z-axis, and Y-axis is vertically set in a vehicle height direction and in a direction perpendicular to the z-axis.

A part (c) of FIG. 5 shows an example of the elliptic sphere expressing the human head, and the elliptic sphere has center coordinates $O(X_0, Y_0, Z_0)$. A coordinate point which can exist when the occupant sits on the seat is selected as the center coordinates. Parameters a, b, and c determine a size of the elliptic sphere, and parameters a, b, and c are set to values appropriate to express the human head.

The elliptic sphere which is of a three-dimensional model of the head is transformed into a two-dimensional image. The elliptic sphere has an elliptic shape when viewed from the z-axis direction as shown by an arrow 55, and therefore the two-dimensional image is generated so as to have the elliptic shape. Furthermore, the two-dimensional image is generated such that each position x, y has a gray-scale value indicating a z-value corresponding to the position x, y.

The technique for generating the two-dimensional image model will be described in detail below. Because an elliptic sphere is expressed by equation (1) as described above, a z-value at each position x, y of the elliptic sphere is expressed by equation (3):

[Formula 3]

$$z = Z_0 + c\sqrt{1 - \frac{(x - X_0)^2}{a^2} - \frac{(x - Y_0)^2}{b^2}} \qquad (3)$$

Then, as shown by an arrow 55, the elliptic sphere is projected to the two-dimensional image in the z-axis direction. The projection is realized by equation (4). In the equation, R11 to R33 represent a rotation matrix. When the elliptic sphere is not rotated, a value of 1 is set to R11 and R22, and value of zero is set to the other parameters. When the elliptic sphere is rotated, values indicating a rotation angle are set to the parameters. Parameters fx, fy, u0, and v0 indicate internal parameters of the image capture device. For example, fx, fy, u0, and v0 include parameters for correcting distortion of lenses and the like.

[Formula 4]

$$\begin{bmatrix} x \\ y \\ 1 \end{bmatrix} = \begin{bmatrix} fx & 0 & u0 \\ 0 & fy & v0 \\ 0 & 0 & 1 \end{bmatrix} \begin{bmatrix} R11 & R12 & R13 & 0 \\ R21 & R22 & R23 & 0 \\ R31 & R32 & R33 & 1 \end{bmatrix} \begin{bmatrix} x \\ y \\ z \\ 1 \end{bmatrix} \qquad (4)$$

Each point (x, y, z) on the surface of the elliptic sphere is projected to coordinates (x, y) of the two-dimensional image by the projection realized by equation (4). A gray-scale value I indicating a z-value of the coordinates (x, y, z) of the object to be projected is allocated to the coordinates (x, y) of the two-dimensional image. The gray-scale value I is computed according to equation (5):

[Formula 5]

$$I(x, y) = \frac{\text{Zmin}}{z} \times (2^N - 1) \qquad (5)$$

In the equation, Zmin indicates the value closest to the image capture device in z-values of coordinates on the surface of the elliptic sphere (elliptic sphere after the rotation when the elliptic sphere is rotated). N is identical to N used in the normalization performed by the normalizing unit 25. When a z-value is Zmin, the highest gray-scale value is allocated to the pixel corresponding to the z-value by equation (5). As a difference between Zmin and a z-value is increased, that is, as a distance to the image capture device is increased, a gray-scale value of the pixel corresponding to the z-value is gradually lowered.

Part (d) of FIG. 5 schematically shows a two-dimensional image of the head model generated in the above-described way. A gray-scale value is gradually lowered from the elliptic center toward the edge. For example, a point 56 shown in part (c) of FIG. 5 is projected to a point 57 of part (d) of FIG. 5. Because a z-value is Zmin at the point 56, the gray-scale value at the point 57 has the highest value (in this case, white). A point 58 is projected to a point 59. A z-value at the point 58 is larger than Zmin, the gray-scale value at the point 59 is lower than the gray-scale value at the point 57.

Thus, the elliptic shape in which the head is viewed from the z-direction as shown in part (a) of FIG. 5 is reflected on the shape of the two-dimensional image model of part (d) of FIG. 5, and a distance to the image capture device in each portion of the head as shown in the part (b) of FIG. 5 is reflected on a gray-scale value of the pixel corresponding to the two-dimensional image model of part (d) of FIG. 5. Thus, although the human head is expressed by three-dimensional data, the human head can be modeled into a two-dimensional image by expressing a distance in the z-direction in terms of a gray-scale value. The generated two-dimensional image model is stored in the memory 25.

It is preferable to prepare plural kinds of head models. For example, because an adult head differs from a child head in size, different head models are used. The elliptic sphere model having a desired size can be generated by adjusting parameters a, b, and c described above. Sizes of the elliptic sphere models may be determined based on statistical results of plural human heads. Elliptic sphere models thus generated are transformed into two-dimensional image models by the above-described technique, and the two-dimensional image models are stored in the memory 25.

It is also preferable to prepare plural head models according to attitudes of the occupant. For example, head models having different inclinations can be prepared in order to detect the head of the occupant whose neck is inclined. For example, an elliptic sphere model rotated by a desired angle can be generated by adjusting values of parameters R11 to R33 in the rotation matrix shown by equation (4). Similarly, the elliptic sphere models are transformed into two-dimensional image models, and the two-dimensional image models are stored in the memory 25.

For example, in the case where the occupant head is disposed with respect to the image capture device as shown in FIG. 4, two-dimensional image models generated from inclined elliptic sphere are required to detect the occupant head.

FIG. 6 shows head models of two-dimensional image stored in the memory 25 in one embodiment. The head models of FIG. 6 have three kinds of sizes, and the size is increased toward the right side. A model having no inclination, a model rotated by $\pi/4$, and a model rotated by $3\pi/4$ are prepared for each size.

Referring to FIG. 1, a correlation unit 26 reads a head model of two-dimensional image from the memory 25, and the correlation unit 26 performs scan with the head model on the already-normalized occupant region generated by the normalizing unit 24. The correlation unit 26 performs matching between the head model and the image region to be scanned in the already-normalized occupant region, and the correlation unit 26 computes correlation values. Any matching techniques can be used.

In the embodiment, a correlation value r is computed according to normalization correlation equation (6) in which a normalizing factor shift, errors in position and attitude and the like are considered. In the equation, S indicates a size of the block to be matched. The size of the block may be, for example, that of one pixel or that of a set of plural pixels (for example, eight by three pixels). The greater a similarity between a head model and the target region to be scanned is, the higher correlation value r is computed.

[Formula 6]

$$r = \frac{S\sum I(x, y)d'(x, y) - \left(\sum I(x, y)\right)\left(\sum d'(x, y)\right)}{\sqrt{\left(S\sum I^2(x, y) - \left(\sum I(x, y)\right)^2\right)\left(S\sum d'^2(x, y) - \left(\sum d'(x, y)\right)^2\right)}} \tag{6}$$

As described above, in the head portion of the occupant region, a distance to the image capture device is gradually increased toward the edge from the point on the head closest to the image capture device, and gray-scale values are allocated in such a way that the values are gradually decreased as the distance is gradually increased. On the other hand, in the head models, a distance to the image capture device is gradually increased from the center toward the edge, and gray-scale values are allocated in such a way that the values are gradually decreased as the distance is gradually increased. Accordingly, when the head models are correlated with the head portion of the occupant region, a higher correlation value r is computed than the head models are correlated with other portions. Thus, the head portion can be detected from the occupant region on the basis of a correlation value r.

Thus, the occupant region normalization expressed by equation (2) is similar to the head model normalization expressed the equation (5) in that a lower gray-scale value is allocated as a distance to the image capture device is increased. However, strictly speaking, a difference exists between the two types of normalization. For example, in equation (2), a gray-scale value becomes the minimum value at the minimum disparity value dmin. On the other hand, in equation (5), a gray-scale value becomes the minimum value when a z-value becomes infinite. However, such a difference in scaling can be compensated by the above-described correlation. A positional error such as a shift in center coordinates in constructing an elliptic sphere model of the head can also be compensated by the correlation. That is, in the correlation, it is determined whether or not a head model is similar to the head portion of the occupant region in a tendency of change in gray scale. That is, a high correlation value is supplied when the correlated image region has a tendency of change in gray scale similar to that of a head model (that is, gray-scale values are gradually lowered from the center toward the edge).

The image region where the highest correlation value r is computed is detected from the already-normalized occupant region, and the human head can be detected based on the positioning and the gray-scale values of the occupant region in the taken image. A size and an inclination (attitude) of the head can be determined based on the correlated head model.

In the case of the plural head models, correlation processing described above is performed for each of the head models of two-dimensional image stored in the memory 25. The head model in which the highest correlation value r is computed is specified, and the image region correlated with the head model is detected in the already-normalized occupant region. The human head can be detected from the positioning and the gray-scale values of the detected image region in the taken image. A size and an inclination (attitude) of the head can be determined based on the head model used to compute the highest correlation value r.

The above-described gray-scale matching of two-dimensional image can be performed at a higher speed than that of the conventional identifying processing in a three-dimensional space. Accordingly, a position, a size, and an attitude of the object can be detected in real time. Other techniques (such as a technique of simultaneously detecting multi models and a technique in which a pyramidal structure is used) can be used in the gray-scale matching.

In order to enhance an accuracy of object recognition, a three-dimensional space range in the vehicle in which the object can exist is derived from the image region where a correlation value not lower than a predetermined value is computed, and the object may be recognized in the range by performing the conventional identifying processing using least squares and the like. The range of the space where the identifying processing should be performed is restricted, so that an amount of computation can be restrained.

Figures 7A, 7B:
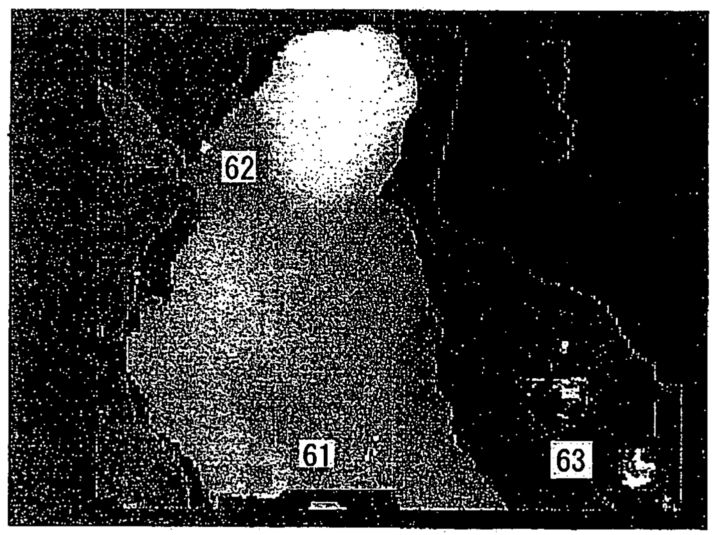
FIG. 7A is a view showing an example of a taken image according to an embodiment of the invention.
FIG. 7B is a view showing an example of a disparity image according to an embodiment of the invention.

FIGS. 7A to 7D show the results in the case where an image of a person sitting on the seat of the vehicle is taken. FIG. 7A shows an image taken by one of the image capture devices 12 and 13. For the purpose of easy understanding, a pattern light emitted from the light source 10 is drawn in a lattice shape so as to be able to be visually observed (actually the pattern light is not visible). FIG. 7B shows a disparity image generated by the disparity image generator 21. An image region where an image of a person is taken is indicated by reference numeral 61, an image region where an image of a seat is taken is indicated by reference numeral 62, and an image region where an image of a background of the seat is taken is indicated by reference numeral 63. The image regions 61 and 62 have disparity values higher than that of the image region 63, because a distance from the image capture device, of the target object (person) of the image region 61 and that of the target object (seat) of the image region 62 are shorter than that of the target object of the image region 63.

Figure 7C:
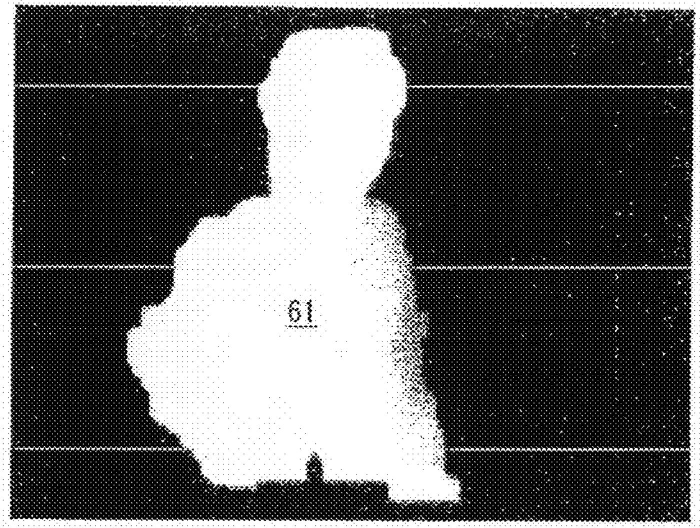
FIG. 7C is a view showing an example of a normalized image in which a background is eliminated according to an embodiment of the invention.

FIG. 7C shows an image after the background elimination and the normalization have been performed. The background eliminating unit 22 has replaced the image regions 62 and 63 with pixels having black gray-scale values. Although pixels of the image region 61 are hardly observed from the drawing due to resolution of the document, the normalizing unit 25 has generated pixels of the image region 61 such that pixels of the image region 61 have gray-scale values indicating distances to the image capture device.

Figure 7D:
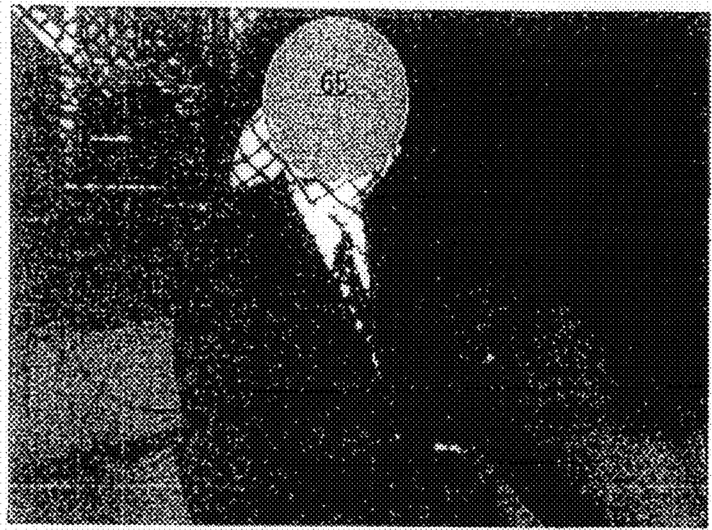
FIG. 7D is a view showing an example of detection result according to an embodiment of the invention.

FIG. 7D shows result of the correlation. In the example, the highest correlation value r is computed when the head model having a certain inclination and a certain size is correlated with the image region 65. Thus, the image region 65 indicating the human head is detected to locate the human head in the space. A size and an attitude of the human head can be determined based on the head model.

Figures 8A, 8B:
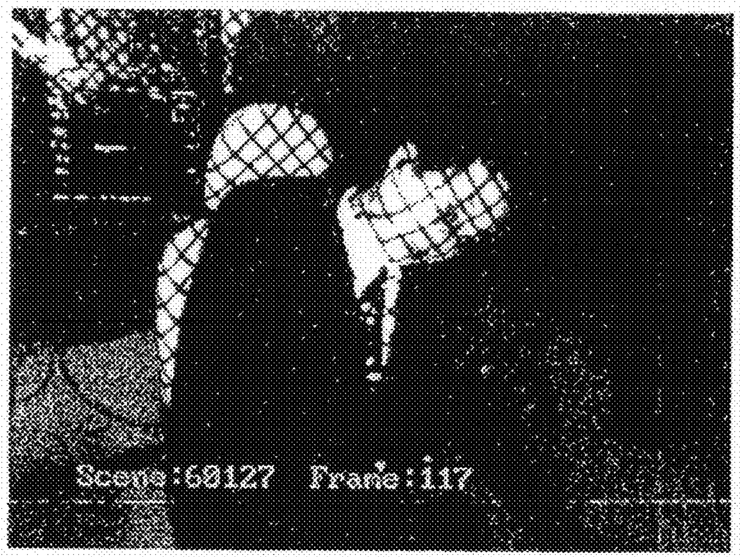
FIG. 8A is a view showing an example of a taken image according to another embodiment of the invention.
FIG. 8B is a view showing an example of a disparity image according to another embodiment of the invention.
Figure 8C:
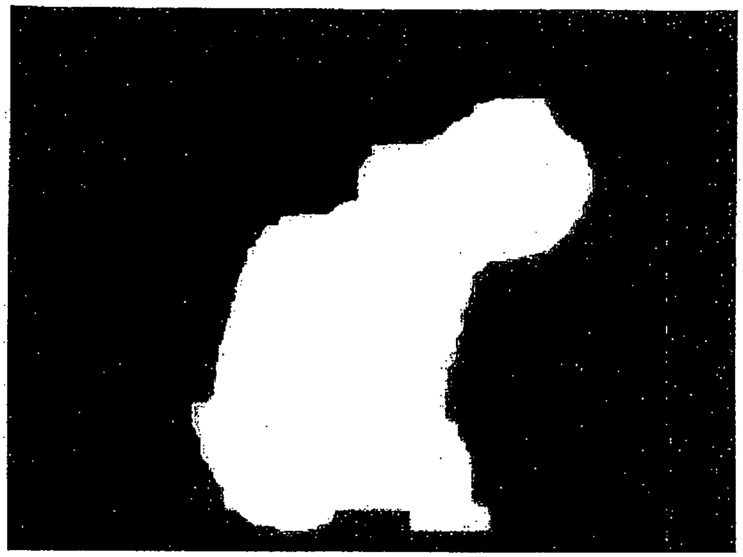
FIG. 8C is a view showing an example of a normalized image in which a background is eliminated according to another embodiment of the invention.
Figure 8D:
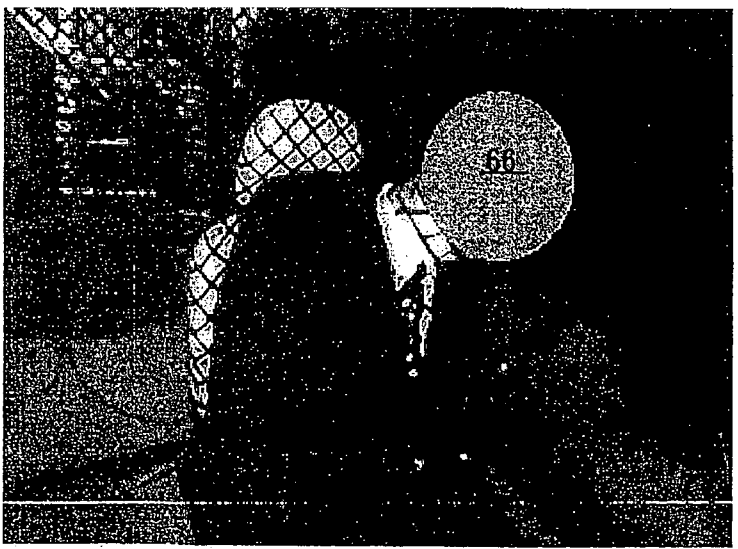
FIG. 8D is a view showing an example of detection result according to another embodiment of the invention.

FIGS. 8A to 8D show results similar to those of FIGS. 7A to 7D. FIGS. 8A to 8D show the results in the case where an image of a person who sits on the seat with the neck inclined, is taken. FIG. 8A shows an image taken by one of the image capture devices 12 and 13. FIG. 8B shows a disparity image generated by the disparity image generating unit 21. FIG. 8C shows an image after the background elimination and the normalization have been performed. FIG. 8D shows result of the correlation. In the example, the highest correlation value r is computed when a head model having a certain inclination and a certain size is correlated with the image region 66. Thus, the image region 66 indicating the human head is detected to locate the human head in the space. A size of the head can be determined and it can be determined that the head is inclined, based on the head model.

Figure 9:
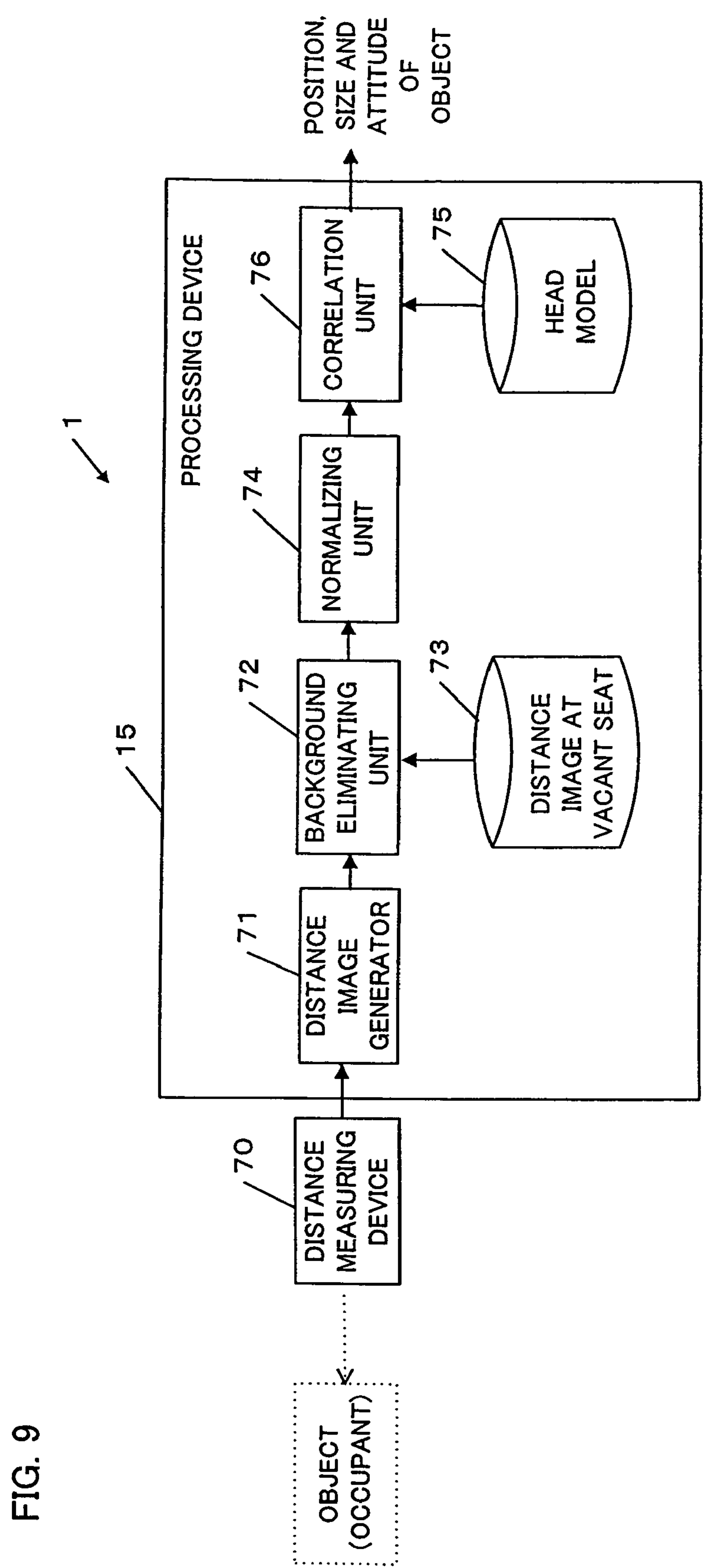
FIG. 9 is a block diagram showing an object detecting device according to another embodiment of the invention.
Figure 10B:
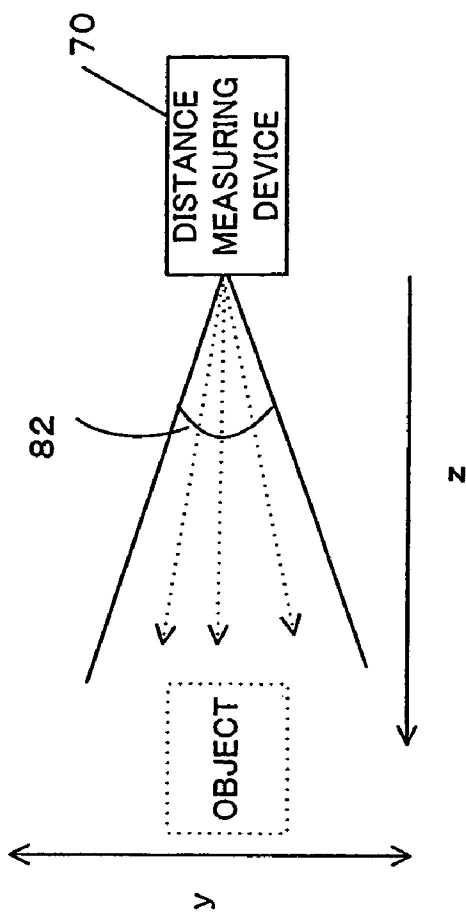
FIG. 10 is a view explaining a distance measuring device according to another embodiment of the invention.
Figure 10A:
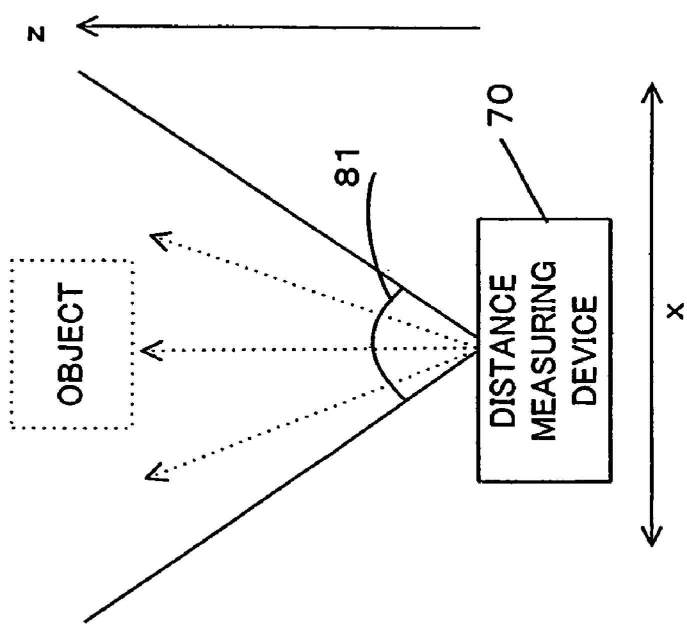

In another embodiment, in the object detecting device 1, a distance measuring device 70 is used instead of the light source and the pair of image capture devices. FIG. 9 shows object detecting device 1 according to the embodiment. For example, the distance measuring device 70 is that using laser scanning. In the device using laser scanning, a target object is irradiated with a laser beam, and a reflection wave from the target object is received, to determine a distance from the measuring device 70 and a relative direction of the target object. As shown in parts (a) and (b) of FIG. 10, x-y-plane is scanned with a laser with predetermined angles 81 and 82, respectively. A predetermined range of the two-dimensional (xy) plane scanned with the laser is segmented into blocks, and a distance from the distance measuring device 70 is measured for each block.

A distance image generator 71 of the processing device 15 generates a distance image by relating a distance value measured for each block with each pixel in the block. A background eliminating unit 72 eliminates the background in the distance image. The background elimination is realized by any appropriate techniques as described above. For example, a distance image which is measured and generated at the vacant seat by the distance measuring device 70 is previously stored in a memory 73. By comparing the distance image at the vacant seat and the currently-taken distance image including the occupant to each other, the background can be eliminated to extract the occupant image region (occupant region).

A normalizing unit 74 normalizes the occupant region. The normalization can be computed by replacing dmin of equation (2) with the maximum distance value Lmax in the occupant region and by replacing dmax with the minimum distance value Lmin in the occupant region.

A memory 75 (which may be the memory 73) stores two-dimensional images of the head modes like the memory 25. The head models are generated by the above-described technique. Here, the image capture device shown in part (c) of FIG. 5 can be replaced with the distance measuring device. A correlation unit 76 can perform correlation by a technique similar to that of the correlation unit 26.

Figure 11:
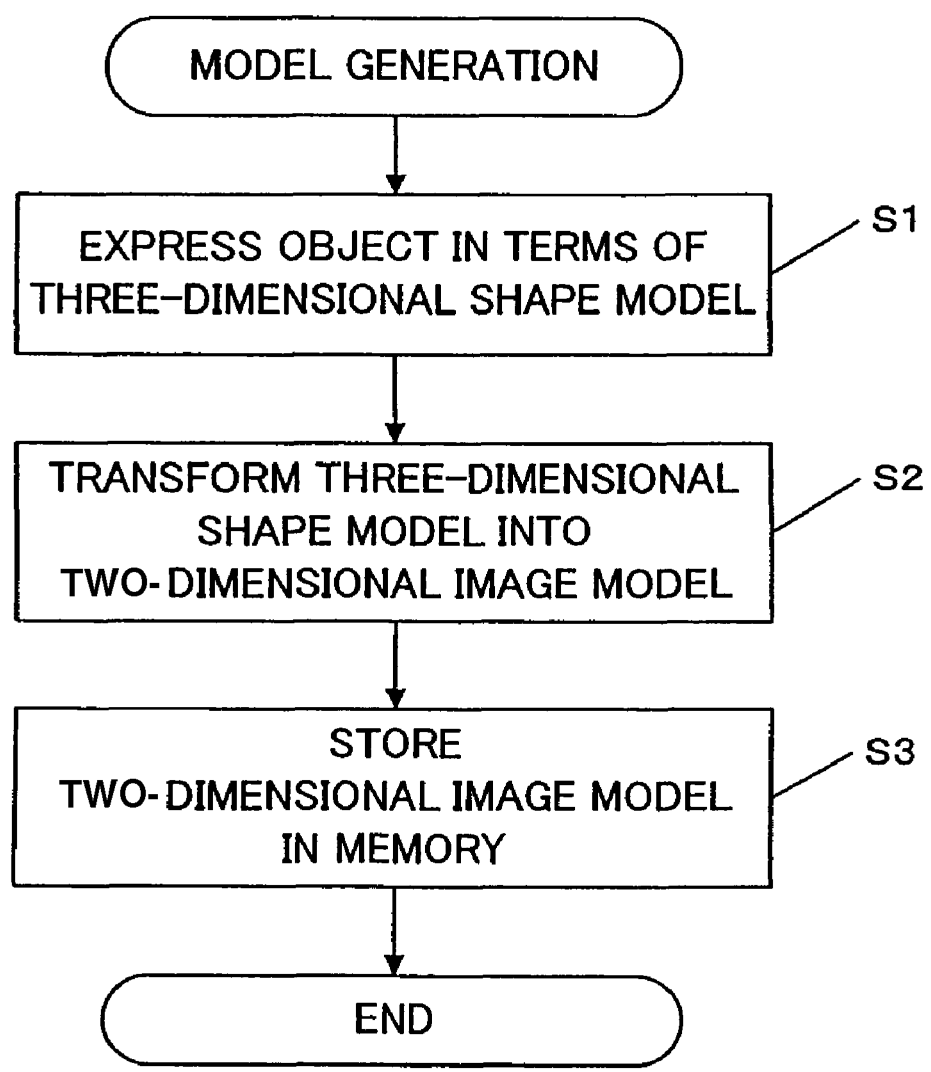
FIG. 11 is a flowchart showing model generating process according to an embodiment of the invention.

FIG. 11 is a flowchart showing a process for generating a head model of two-dimensional image according to an embodiment of the invention. The process of FIG. 11 can be performed prior to object detection by the processing device which is realized by a computer including a CPU, a memory, an input and output interface and the like.

In Step S1, as shown in part (c) of FIG. 5, the human head is expressed by a three-dimensional shape model, in this case, by an elliptic sphere. In Step S2, as shown in part (d) of FIG. 5, the elliptic sphere is transformed into a two-dimensional image model by, for example, projection. In Step S3, the two-dimensional image model is stored in a memory.

The head model generating process can be performed repeatedly for each kind of size and attitude (in this case, inclination) of the human head to be detected. Thus, head models modeling various sizes and attitudes can be stored in the memory.

Figure 12:
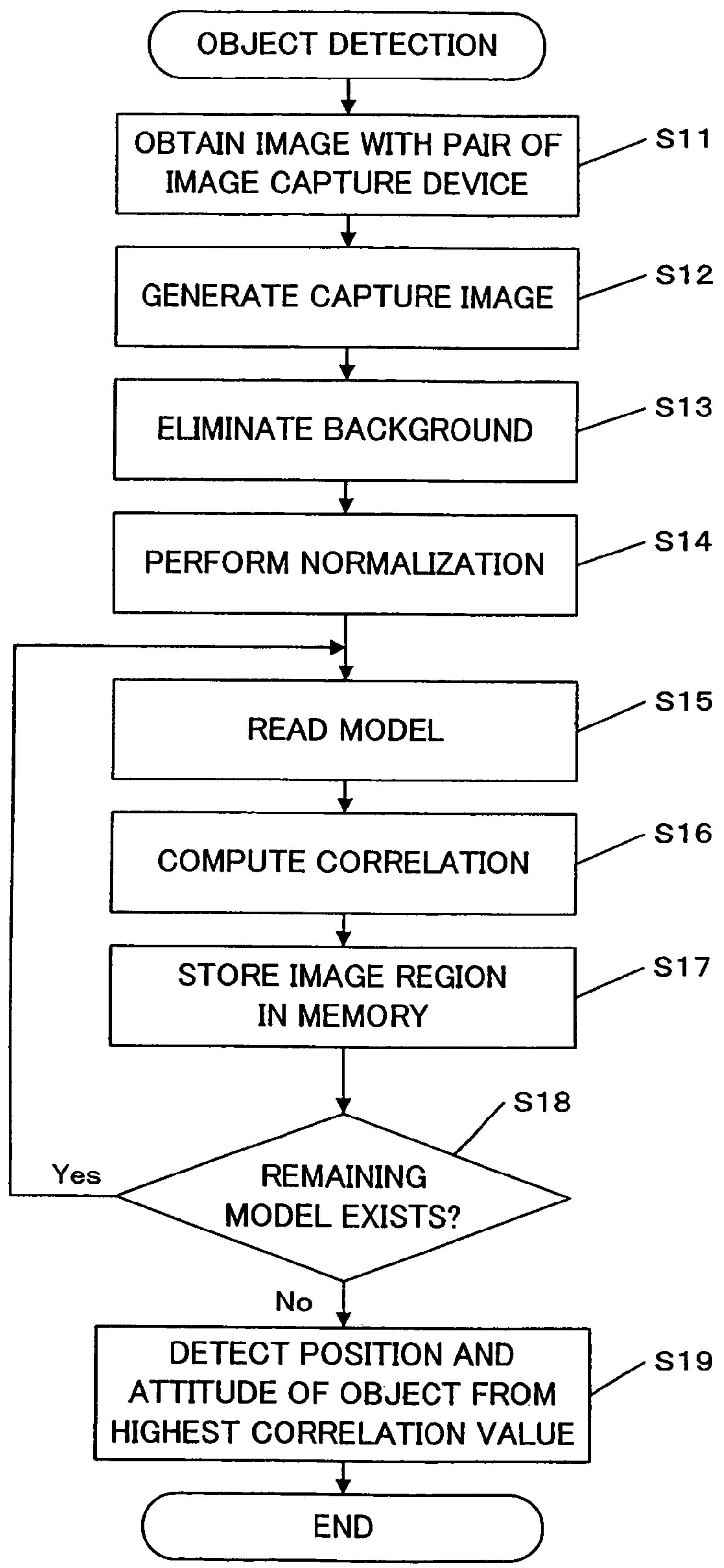
FIG. 12 is a flowchart showing object detecting process according to an embodiment of the invention.

FIG. 12 shows a flowchart of object detecting process. The object detecting process is performed at predetermined time intervals. In an embodiment, the object detecting process is performed by the processing device 15 shown in FIG. 1.

In Step S11, the pair of image capture devices obtains images including the human head. In Step S12, a disparity image is generated from the obtained images. In Step S13, the background is eliminated from the disparity image to extract an image region (occupant region) including the person. After the background has been eliminated, grain analyzing process such as expansion and contraction and smoothing process (for example, with a median filter) may be performed to eliminate noises.

In Step S14, the occupant region is normalized according to equation (2). In Step S15, a previously-generated head model is read from the memory. In Step S16, scan with the head model is performed on the normalized occupant region to compute a correlation value indicating a similarity between the head model and an image region which is overlapped by the head mode. In Step S17, the image region where the highest correlation value is computed is stored in the memory in such a way that the image region is related with the correlation value and the head model.

In Step S18, it is determined whether or not another head model to be correlated exists. When affirmative, the process is repeated from Step S15.

In Step S19, the highest correlation value is selected in the correlation values stored in the memory, and a position at which the human head exists, a size, and an attitude are supplied based on the image region and the head model corresponding to the correlation value.

In the case where the distance measuring device is used instead of the image capture device, the distance measuring device is used in Step S11, and a distance image is generated in Step S12.

In the embodiments described above, correlation between a two-dimensional image model and an image region is computed with respect to a tendency that a gray-scale value is lowered as a distance to the image capture device is increased. A tendency different from the tendency of the gray-scale value may be used. For example, a similarity may be determined with respect to a tendency that a gray-scale value is increased as a distance to the image capture device is increased.

Although the embodiments in which the human head is detected are described above, the object detecting device of the invention can be applied to modes in which other objects are detected. For example, an object different from the human can be detected by generating a two-dimensional image model which has a characteristic shape when viewed from a predetermined direction, and in which a distance in the predetermined direction is expressed in terms of gray-scale values.

Although the embodiments in which the object detecting device is mounted on a vehicle are described above, the object detecting device of the invention can be applied to various modes. For example, the object detecting device of the invention can also be applied to a mode in which approach of a certain object (for example, the human head) is detected to take action (for example, issuing a message) in response to the detection.

The invention claimed is:

1. An object detecting device comprising:

a pair of imaging means for taking an image of a three-dimensional object;

disparity data computing means for computing disparity data for each region based on the images obtained by the pair of imaging means, each region being obtained as a block comprising one or more pixels by dividing the image;

gray-scale image generating means for computing a gray-scale value indicating a distance to the imaging means based on the disparity data computed for each region and generating a gray-scale image having the gray-scale value corresponding to each region;

model storage means in which a model modeling the three-dimensional object is stored;

correlation value computing means for computing a correlation value indicating a similarity between the model and an image region in the gray-scale image, the model being a two-dimensional image having a geometric feature when the three-dimensional object is viewed from a direction in which the imaging means are located, each region obtained by dividing the two-dimensional image having a gray-scale value indicating a distance to the imaging means, of a corresponding portion of the three-dimensional object, the correlation value being computed based on the degree of similarity of a tendency of change in gray scale obtained through matching between gray-scale values of the model and gray-scale values of the image region in the gray-scale image; and object detecting means for detecting the three-dimensional object by detecting an image region in the gray-scale image, having a highest correlation value with the model, wherein a plurality of models are stored in the model storage means according to a size and an attitude of the three-dimensional object, the correlation value computing means computes the correlation value for each of the plurality of models, and the object detecting means determines a size and an attitude of the three-dimensional object based on the model correlated with an image region having the highest correlation value, in the plurality of models.

2. The object detecting device according to claim 1, wherein the three-dimensional object is a human head, and the model is a two-dimensional image having an elliptic shape.

3. The object detecting device according to claim 2, wherein the detected human head is a head of a human riding on a vehicle.

4. The object detecting device according to claim 1, comprising pattern light illuminating means for illuminating the object with pattern light having a predetermined pattern.

5. The object detecting device according to claim 1, wherein the object detecting device is one which detects an occupant in a vehicle, the object detecting device comprises occupant region detecting device which detects an occupant region, where the occupant exists, in the image obtained by the imaging devices, based on the disparity data when the occupant sits on a seat and the disparity data at a vacant seat, and the gray-scale image generating device generates the gray-scale image based on the occupant region.

6. An object detecting device comprising:

distance measuring means for measuring a distance to each region, each region being obtained as a block comprising one or more pixels by dividing a predetermined range including a three-dimensional object;

gray-scale image generating means for computing a gray-scale value indicating a distance measured by the distance measuring means and generating a gray-scale image having the gray-scale value corresponding to each region;

model storage means in which a model is stored, the model being formed by modeling the three-dimensional object;

correlation value computing means for computing a correlation value indicating a similarity between the model and an image region in the gray-scale image, the model being a two-dimensional image having a geometric feature when the three-dimensional object is viewed from a direction in which the distance measuring means is located, each region obtained by dividing the two-dimensional image having a gray-scale value indicating a distance to the distance measuring means, of a corresponding portion of the three-dimensional object, the correlation value being computed based on the degree of similarity of a tendency of change in gray scale obtained through matching between gray-scale values of the model and gray-scale values of the image region in the gray-scale image; and object detecting means for detecting the three-dimensional object by detecting an image region in the gray-scale image, having a highest correlation value with the model, wherein a plurality of models are stored in the model storage means according to a size and an attitude of the three-dimensional object, the correlation value computing means computes the correlation value for each of the plurality of models, and the object detecting means determines a size and an attitude of the three-dimensional object based on the model correlated with an image region having the highest correlation value, in the plurality of models.

7. The object detecting device according to claim 6, wherein a plurality of models are stored in the model storage means according to a size and an attitude of the three-dimensional object, the correlation value computing means computes the correlation value for each of the plurality of models, and the object detecting means determines a size and an attitude of the three-dimensional object based on the model correlated with an image region having the highest correlation value, in the plurality of models.

8. The object detecting device according to claim 6, wherein the three-dimensional object is a human head, and the model is a two-dimensional image having an elliptic shape.

9. The object detecting device according to claim 8, wherein the detected human head is a head of a human riding on a vehicle.

10. An object detecting device comprising:

a pair of imaging means for taking an image of a three-dimensional object;

disparity data computing means for computing disparity data for each region based on the images obtained by the pair of imaging means, each region being obtained as a block comprising one or more pixels by dividing the image;

gray-scale image generating means for computing a gray-scale value indicating a distance to the imaging means based on the disparity data computed for each region and generating a gray-scale image having the gray-scale value corresponding to each region;

model storage means in which a model modeling the three-dimensional object is stored;

correlation value computing means for computing a correlation value indicating a similarity between the model and an image region in the gray-scale image, the model being a two-dimensional image having a geometric feature when the three-dimensional object is viewed from a direction in which the imaging means are located, each region obtained by dividing the two-dimensional image having a gray-scale value indicating a distance to the imaging means, of a corresponding portion of the three-dimensional object, the correlation value being computed based on the degree of similarity of a tendency of change in gray scale obtained through matching between gray-scale values of the model and gray-scale values of the image region in the gray-scale image; and object detecting means for detecting the three-dimensional object by detecting an image region in the gray-scale image, having a highest correlation value with the model, wherein the object detecting device is one which detects an occupant in a vehicle, the object detecting device comprises occupant region detecting means for detecting an occupant region, where the occupant exists, in the image obtained by the imaging means, based on the disparity data when the occupant sits on a seat and the disparity data at a vacant seat, and the gray-scale image generating means generates the gray-scale image based on the occupant region.

11. An object detecting device comprising:

distance measuring means for measuring a distance to each region, each region being obtained as a block comprising one or more pixels by dividing a predetermined range including a three-dimensional object;

gray-scale image generating means for computing a gray-scale value indicating a distance measured by the distance measuring means and generating a gray-scale image having the gray-scale value corresponding to each region;

model storage means in which a model is stored, the model being formed by modeling the three-dimensional object;

correlation value computing means for computing a correlation value indicating a similarity between the model and an image region in the gray-scale image, the model being a two-dimensional image having a geometric feature when the three-dimensional object is viewed from a direction in which the distance measuring means is located, each region obtained by dividing the two-dimensional image having a gray-scale value indicating a distance to the distance measuring means, of a corresponding portion of the three-dimensional object, the correlation value being computed based on the degree of similarity of a tendency of change in gray scale obtained through matching between gray-scale values of the model and gray-scale values of the image region in the gray-scale image; and object detecting means for detecting the three-dimensional object by detecting an image region in the gray-scale image, having a highest correlation value with the model, wherein the object detecting device is one which detects an occupant in a vehicle, the object detecting device comprises occupant region detecting means for detecting an occupant region, where the occupant exists, in a predetermined range measured by the distance measuring means, based on the distance measured by the distance measuring means when the occupant sits on a seat and the distance measured by the distance measuring means at a vacant seat, and the gray-scale image generating means generates the gray-scale image based on the occupant region.

12. An object detecting device comprising:

a pair of imaging capturing devices which capture an image of a three-dimensional object;

a disparity data computing device which computes disparity data for each region based on the images obtained by the pair of imaging capturing devices, each region being obtained as a block comprising one or more pixels by dividing the image;

a gray-scale image generating device which calculates a gray-scale value indicating a distance to the imaging capturing devices based on the disparity data computed for each region and generates a gray-scale image having the gray-scale value corresponding to each region;

a model storage device in which a model modeling the three-dimensional object is stored;

a correlation value computing device which computes a correlation value indicating a similarity between the model and an image region in the gray-scale image, the model being a two-dimensional image having a geometric feature when the three-dimensional object is viewed from a direction in which the imaging capturing devices are located, each region obtained by dividing the two-dimensional image having a gray-scale value indicating a distance to the imaging capturing devices, of a corresponding portion of the three-dimensional object, the correlation value being computed based on the degree of similarity of a tendency of change in gray scale obtained through matching between gray-scale values of the model and gray-scale values of the image region in the gray-scale image; and an object detector which detects the three-dimensional object by detecting an image region in the gray-scale image, having a highest correlation value with the model, wherein a plurality of models are stored in the model storage means according to a size and an attitude of the three-dimensional object, the correlation value computing means computes the correlation value for each of the plurality of models, and the object detecting means determines a size and an attitude of the three-dimensional object based on the model correlated with an image region having the highest correlation value, in the plurality of models.

13. The object detecting device according to claim 12, wherein the three-dimensional object is a human head, and the model is a two-dimensional image having an elliptic shape.

14. The object detecting device according to claim 13, wherein the detected human head is a head of a human riding on a vehicle.

15. An object detecting device comprising:

a pair of imaging capturing devices which capture an image of a three-dimensional object;

a disparity data computing device which computes disparity data for each region based on the images obtained by the pair of imaging capturing devices, each region being obtained as a block comprising one or more pixels by dividing the image;

a gray-scale image generating device which calculates a gray-scale value indicating a distance to the imaging capturing devices based on the disparity data computed for each region and generates a gray-scale image having the gray-scale value corresponding to each region;

a model storage device in which a model modeling the three-dimensional object is stored;

a correlation value computing device which computes a correlation value indicating a similarity between the model and an image region in the gray-scale image, the model being a two-dimensional image having a geometric feature when the three-dimensional object is viewed from a direction in which the imaging capturing devices are located, each region obtained by dividing the two-dimensional image having a gray-scale value indicating a distance to the imaging capturing devices, of a corresponding portion of the three-dimensional object, the correlation value being computed based on the degree of similarity of a tendency of change in gray scale obtained through matching between gray-scale values of the model and gray-scale values of the image region in the gray-scale image; and an object detector which detects the three-dimensional object by detecting an image region in the gray-scale image, having a highest correlation value with the model, wherein the object detecting device is one which detects an occupant in a vehicle, the object detecting device comprises occupant region detecting means for detecting an occupant region, where the occupant exists, in the image obtained by the imaging means, based on the disparity data when the occupant sits on a seat and the disparity data at a vacant seat, and the gray-scale image generating means generates the gray-scale image based on the occupant region.

16. The object detecting device according to claim 15, wherein a plurality of models are stored in the model storage device according to a size and an attitude of the three-dimensional object, the correlation value computing device computes the correlation value for each of the plurality of models, and the object detector determines a size and an attitude of the three-dimensional object based on the model correlated with an image region having the highest correlation value, in the plurality of models.

17. The object detecting device according to claim 15, wherein the three-dimensional object is a human head, and the model is a two-dimensional image having an elliptic shape.

18. The object detecting device according to claim 16, wherein the detected human head is a head of a human riding on a vehicle.

* * * * *